US012411898B2

(12) United States Patent
Olsen-Kristiansen et al.

(10) Patent No.: US 12,411,898 B2
(45) Date of Patent: Sep. 9, 2025

(54) DYNAMICALLY FILTERING SEARCH RESULTS USING CONTEXTUAL USER INTERACTION DATA

(71) Applicant: Microsoft Technology Licensing, LLC, Redmond, WA (US)

(72) Inventors: Bernt Ivar Olsen-Kristiansen, Tromsø (NO); Jon Meling, Tromsø (NO); Bjørnstein Lilleby, Tromsø (NO); Steffen Viken Valvåg, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 18/173,778

(22) Filed: Feb. 23, 2023

(65) Prior Publication Data
US 2024/0289397 A1 Aug. 29, 2024

(51) Int. Cl.
*G06F 16/00* (2019.01)
*G06F 16/9535* (2019.01)
*G06F 16/954* (2019.01)
*H04L 67/50* (2022.01)

(52) U.S. Cl.
CPC ........ *G06F 16/9535* (2019.01); *G06F 16/954* (2019.01); *H04L 67/535* (2022.05)

(58) Field of Classification Search
CPC ............... G06F 16/954; G06F 16/9538; G06F 16/9535; H04L 67/535
See application file for complete search history.

(56) References Cited

U.S. PATENT DOCUMENTS

| | | | |
|---|---|---|---|
| 8,862,574 B2 | 10/2014 | Yolleck et al. | |
| 9,940,409 B2 | 4/2018 | Shelkey et al. | |
| 10,459,998 B1 | 10/2019 | Westphal | |
| 10,536,542 B1* | 1/2020 | Dorner | H04L 51/52 |
| 10,929,478 B2 | 2/2021 | Ben-yair et al. | |
| 11,847,241 B1* | 12/2023 | Cahill | H04L 63/102 |
| 11,848,101 B2* | 12/2023 | Shah | G06Q 50/22 |
| 2004/0267700 A1* | 12/2004 | Dumais | G06F 16/31 |
| 2010/0010968 A1 | 1/2010 | Redlich et al. | |
| 2011/0035263 A1* | 2/2011 | Ramanathan | G06Q 30/02 705/14.4 |

(Continued)

OTHER PUBLICATIONS

International Search Report and Written Opinion received for PCT Application No. PCT/US2024/015888, May 15, 2024, 14 pages.

(Continued)

*Primary Examiner* — Yicun Wu
(74) *Attorney, Agent, or Firm* — Barta Jones, PLLC

(57) ABSTRACT

A computerized method filters search result content using user interaction data. Search result content, including search result entries, is presented. User interaction data is received that is indicative of a user's interactions with the presented search result content and a result filter rule is determined using the user interaction data. Filtered search result content is generated using the determined result filter rule and the generated filtered search result content, including a portion of the search result entries, is presented. In some examples, the user is prompted to accept the filtering of the search result content prior to the generation of the filtered search result content. Thus, the search result content is dynamically filtered based on the user's interactions with that content while the user reviews the content.

20 Claims, 8 Drawing Sheets

(56) References Cited

U.S. PATENT DOCUMENTS

| | | | | |
|---|---|---|---|---|
| 2016/0125043 | A1* | 5/2016 | Shelkey | G06Q 10/10 |
| | | | | 707/722 |
| 2016/0292445 | A1* | 10/2016 | Lindemann | G06F 16/353 |
| 2020/0151185 | A1 | 5/2020 | Raczko | |
| 2021/0374859 | A1 | 12/2021 | Lane | |
| 2022/0365942 | A1* | 11/2022 | Zhou | G06F 16/24526 |
| 2023/0004601 | A1* | 1/2023 | Rajan | G06F 16/90335 |

OTHER PUBLICATIONS

"Contextual Filter", Retrieved From: https://experience.sap.com/fiori-design-web/v1-66/contextual-filter/, Jun. 10, 2020, 8 Pages.

"Contextual Filters in Views", Retrieved From: https://drupal.gatech.edu/handbook/contextual-filters-views, Retrieved on: Sep. 30, 2022, 4 Pages.

* cited by examiner

DYNAMICALLY FILTERING SEARCH RESULTS USING CONTEXTUAL USER INTERACTION DATA

BACKGROUND

Search engines are tools that are vital for navigating large quantities of data on the Internet, in large file databases, or the like. However, defining effective searches that quickly provide the desired results is challenging for many users. Search filter can be helpful, but many search filters tend to be static and not reflective of the desired search content and/or not responsive to user input.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for filtering search result content using user interaction data is described. Search result content, including search result entries, is presented. User interaction data is received that is indicative of a user's interactions with the presented search result content and a result filter rule is determined using the user interaction data. Filtered search result content is generated using the determined result filter rule and the generated filtered search result content, including a portion of the search result entries, is presented.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 8, the systems are illustrated as schematic drawings. The drawings may not be to scale. Any of the figures may be combined into a single example or embodiment.

DETAILED DESCRIPTION

Figure 1:
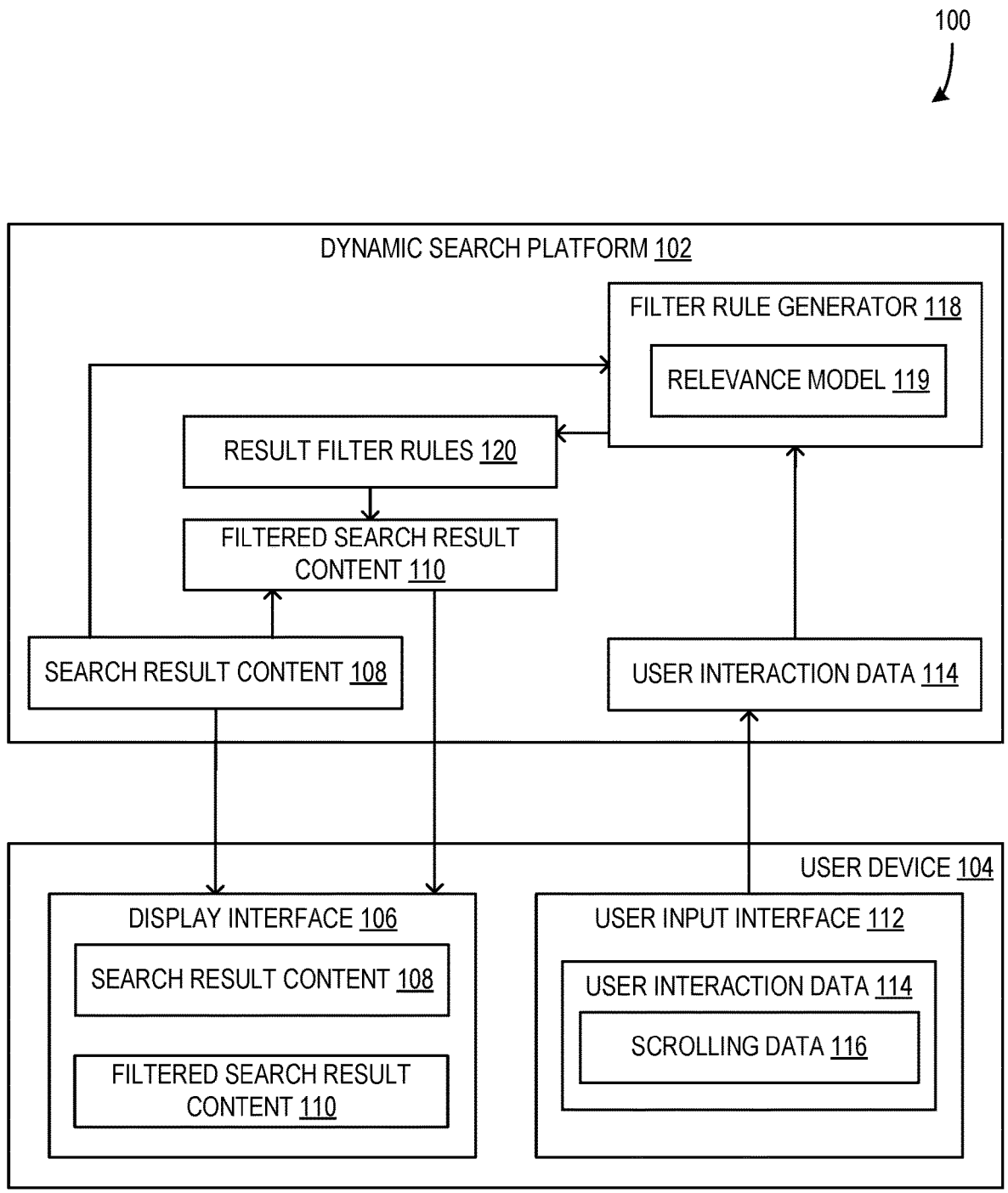
FIG. 1 is a block diagram illustrating an example system configured for providing filtered search result content using user interaction data.

Aspects of the disclosure provide a system and method for dynamically filtering search results while the user is viewing and interacting with the search results. The user is presented with search result content and proceeds to review that content, including taking actions such as scrolling through the entries, selecting to view another page of entries, selecting to hide an entry, and/or selecting to open or otherwise activate an entry. The user may also choose to ignore or skip over one or more entries. Data associated with such interactions is collected and provided to a dynamic search platform (e.g., one or more servers). The platform analyzes the interaction data and generates result filter rules to be applied to the search result content to improve the relevance of additional entries to be displayed to the user. These result filter rules are then applied to the search result content, such that additional content presented to the user (e.g., due to scrolling or loading new pages) more accurately reflects results matching user intent.

The disclosure operates in an unconventional manner at least by collecting the user interaction data and dynamically generating and applying filter rules based on that data while the user is reviewing the search result content. This enables users of the system to obtain the search results they want in a relatively seamless way. For example, for a user that is viewing the search results using an "infinite scrolling" interface, new results that are presented due to scrolling can be filtered, even though previously presented results were not filtered. The filters may be applied automatically or based on the user accepting the filters using prompts as described herein.

Prompting users to accept or reject the dynamically generated filter rules enables the users to quickly improve the quality of the displayed search results. Further, in some examples, user responses to rules prompts are used as part of the user interaction data for the generation of future result filter rules. The described iterative generation and suggestion of filter rules based on the collected user interaction data accelerates the search process toward a desirable result for the user and reduces the consumption of compute, memory, and/or data storage resources of associated computing systems over time, by displaying more relevant content earlier in the search process.

Further, in some examples, the analysis of the user interaction data and other contextual data is leveraged to generate changes to the search query input that can be suggested to the user to educate them for refining the current search and/or for improving future searches.

The disclosure is configured to analyze the entries that the user is scrolling past as they review the search results and, based on those entries, the disclosure is configured to generate the described result filter rules. Scrolling past a sufficient quantity of entries that share a particular feature or property is used to generate a result filter rule to filter out entries with that particular feature or property when presenting future search result content. Such analysis of scrolling data further reduces the time required to present the desired result to the user and the consumption of resources of the computing devices that are serving the search results.

Additionally, in some examples, the disclosure is configured to detect groups or clusters of similar results that have not been presented yet and, as a result of user interactions indicating a lack of interest in currently presented search result entries, the disclosure is configured to suggest that a detected group or cluster of similar results be reviewed instead. In some examples, the performance of these operations enables a user to quickly jump to other groups of results when the currently presented results are not related to what the user is looking for. Similarly, this feature substantially reduces the computing resources required of the associated computing devices to present search result content to the user until the group or cluster of similar resources is found and presented.

FIG. 1 is a block diagram illustrating an example system 100 configured for providing filtered search result content 110 using user interaction data 114. In some examples, the dynamic search platform 102 is configured to use collected user interaction data 114, including scrolling data 116, from a user input interface 112 of a user device 104 to generate result filter rules 120. The result filter rules 120 are then applied to the search result content 108 to generate filtered search result content 110 and that content 110 is provided to a display interface 106 of the user device 104, where the content 110 is displayed to a user.

Further, in some examples, the system 100 includes one or more computing devices (e.g., the computing apparatus of FIG. 8) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the user device 104 is a first computing device while the dynamic search platform 102 occupies a plurality of other computing devices. The user device 104 and/or the multiple devices of the dynamic search platform 102 are configured to communicate with each other via network connections as described herein. Alternatively, in other examples, the dynamic search platform 102 is located on and/or executed on the user device 104, such that the system 100 is located on that single device. In still other examples, other organizations of computing devices are used to implement the system 100 without departing from the description.

In some examples, the system 100 is configured to receive search query input from a user of the user device 104 and to generate initial search result content 108 in response to the search query input. In some examples, the search query input includes one or more words or other search terms that are used as input to a search engine, which then identifies items in a data set (e.g., stored in one or more databases or other data storage structures) that correspond to the search query input. Further, the search engine is configured to generate the search result content 108 in such a way that the identified items of the data set that are determined to be relevant with respect to the search query input are included in the search result content 108 as search results or search result entries.

In some examples, the search result entries of the search result content 108 include entries of one or more different entry types. For instance, in some examples, the search engine is configured to return websites that are relevant to the search query input, while in other examples, the search engine is configured to return documents, images, or other media files in addition to or instead of websites. In other examples, the search result entries include entries associated with more, fewer, or different entry types without departing from the description.

The search result content 108 is provided to the user device 104 and displayed on the display interface 106. In some examples, the display interface is a monitor, touchscreen, or other screen interface. Further, in some examples, the search result content 108 is displayed in such a way that the entries of the content 108 are ordered, such as ordered from most relevant to the search query input to least relevant to the search query input. Additionally, or alternatively, a user of user device 104 is enabled to select a method of ordering the entries of the search result content 108, such as changing the order to be by date, by name of an author or other creator of the media, or the like.

In some examples, displaying the search result content 108 in the display interface 106 includes displaying the search result content 108 in an interface configured to continuously scroll, such that when the user chooses to scroll away from current result to next results, the next results are dynamically loaded to the interface and the user is presented with a continuous list or stream of search result entries. In other examples, the search result content 108 is displayed in a paginated interface, such that each page of search result entries includes a quantity of search result entries, and a user is enabled to navigate to other pages of search result entries instead of, or in addition to, scrolling through the currently displayed search result entries.

In some examples, the user input interface 112 of user device 104 includes a keyboard, mouse, touchscreen interface, or the like. The user input interface 112 is configured to collect user interaction data 114 that is indicative of actions taken by the user of the user device 104 in response to the displayed search result content 108 and/or the filtered search result content 110. In some examples, the user interaction data 114 includes scrolling data 116 that is indicative of when the user scrolls through and/or past search result entries of the search result content 108, when the user stops scrolling and the associated search result entries that are currently displayed in the display interface 106, and the like. Additionally, or alternatively, other user interaction data 114 includes: data indicating that the user selected displayed search result entries, data indicating that the user chose to hide search result entries from the displayed list of entries, data indicating that the user chose to navigate to a next page of search result entries, data indicating that the user highlighted displayed search result entries, or the like. In other examples, more, fewer, or different kinds of user interaction data 114 are collected on the user device 104 and provided to the dynamic search platform 102 without departing from the description.

Further, in some examples, the dynamic search platform 102 includes a filter rule generator 118 that is used in generating the result filter rules 120. The filter rule generator 118 includes hardware, firmware, and/or software that is configured to analyze the user interaction data 114 in combination with the current search result content 108 to generate result filter rules 120 that can be used to filter the search result content 108 to better fit the types of results for which the user of the user device 104 is looking. For instance, in some examples, the filter rule generator 118 determines that the user has scrolled past a quantity of search result entries that are image files. As a result, the filter rule generator 118 is configured to infer that the user is not interested in image files as results of the search query. A result filter rule 120 to filter out image file entries from the search result content 108 is then generated. In some examples, the result filter rules 120 generated are based on the user interaction data 114 including patterns from which likely user intents can be determined. In the above example, the user interaction data 114 includes a pattern of the user scrolling past a certain quantity of image files and the associated result filter rule 120 was generated as a result. For example, the quantity threshold required to satisfy the pattern can be a defined value, a percentage of total entries that have been scrolled past, or the like. In other examples, more, fewer, or different patterns are identified in the user interaction data 114 and associated result filter rules 120 are generated based on those patterns without departing from the description. In some examples, other result filter rules 120 include rules that filter search result entries using entry types, rules that filter search result entries using date information of the entries (e.g., the date that a document was created, the date that an entry was last updated, or the like), and/or rules that filter search result entries using an author identity or an identity of another person or entity associated with the search result entries.

In some examples, the filter rule generator 118 is configured to generate multiple result filter rules 120 using the user interaction data 114 and search result content 108 as described herein. Some or all of the multiple result filter rules 120 are then applied to the search result content 108 to generate the filtered search result content 110, as described herein. In an example, a first result filter rule 120 is generated to filter out entries that are older than one year and a second result filter rule 120 is generated to filter out entries that are image files. Both of the generated rules 120 are applied to the search result content 108 such that the filtered search result content 110 does not include entries that are older than one year or entries that are image files.

Further, in some examples, the filter rule generator 118 includes a relevance model 119 that is used to analyze the user interaction data 114 in order to generate the result filter rules 120. The relevance model 119 is a model trained using machine learning to associate user interaction data 114, including scrolling data 116, with types of result filter rules 120 and/or specific features or values for use in the result filter rules 120. In some examples, the relevance model 119 receives a set of user interaction data 114 as input and generates a set or list of result filter rules 120 that are associated with relevance values that indicate the degree to which each result filter rule 120 is likely to be relevant to the user interaction data 114. Some or all of the list of result filter rules 120 can be applied to generate the filtered search result content 110, wherein the result filter rules 120 with the highest relevance values or that are otherwise considered the most relevant are the most likely to be applied to generate the filtered search result content 110.

After the filtered search result content 110 is generated at the dynamic search platform 102, the filtered search result content 110 is provided to the user device 104 for display in the display interface 106. In some examples, the search result content 108 is displayed in an infinite scroll interface, such that the filtered search result content 110 is included after the portion of the search result content 108 currently being displayed, as the user scrolls. In some such examples, the search result content 108 that has already been displayed is not updated by applying the result filter rules 120. Only newly displayed search result entries reflect the filtered search result content 110. Alternatively, in other examples, the displayed search result entries of the search result content 108 that have already been displayed are updated and/or refreshed to reflect the application of the result filter rules 120, such that only the filtered search result content 110 is displayed in place of the original search result content 108.

Further, in examples where the search result content 108 and/or filtered search result content 110 is displayed on the display interface 106 using a paginated display method, the filtered search result content 110 is reflected in newly displayed search result entries as the user navigates the pages of the interface. In this way, previously viewed pages of entries remain entries of the original search result content 108 and pages accessed after the result filter rules 120 have been applied include entries of the filtered search result content 110. Alternatively, in other examples, the displayed search result entries of the search result content 108 that have already been displayed on pages of the interface are updated and/or refreshed to reflect the application of the result filter rules 120, such that only the filtered search result content 110 is displayed in place of the original search result content 108.

Additionally, or alternatively, in some examples, the dynamic search platform 102 is configured to prompt a user of the user device 104 to select or otherwise approve the application of one or more of the result filter rules 120 before the result filter rules 120 are used to generate the filtered search result content 110 and/or cause the filtered search result content 110 to be displayed on the display interface 106. In some examples, after a sufficient quantity of user interaction data 114 is collected and provided to the dynamic search platform 102 and the filter rule generator 118 has generated at least one result filter rule 120, the dynamic search platform 102 causes the display interface 106 of the user device 104 to display a prompt that includes information associated with the generated result filter rule or rules 120. In an example, the prompt includes language informing the user that they can select one or more of the suggested result filter rules 120 to apply to the search result content 108 to further refine the search. If the user agrees and/or selects one or more of the result filter rules 120 to be applied, the dynamic search platform 102 does so, generating the filtered search result content 110 and providing that filtered search result content 110 for display to the user on the display interface 106. If the user declines or otherwise does not choose any of the filter rules 120, the display interface 106 continues to display the entries of the search result content 108 without applying any filter rules 120.

Further, in some examples, the prompts provided to the user by the dynamic search platform 102 include suggested changes to the original search query input to improve the accuracy and/or efficiency of the user's search. In some of these examples, the suggested changes are generated as a result of the generated result filter rules 120. When a result filter rule 120 is generated that could have been originally included in the search query input by using a certain combination or format of input, the associated changes to the search query input to achieve such a search are provided to the user via the display interface 106, informing the user of how to improve their search query input in the future to provide more relevant results with less scrolling or paging through results. This may be provided in a "did you know?" UI element presented to the user, such as "did you know that you can scope to only image files by including this filter?".

In some examples, the user device 104 is configured to send scrolling data 116 and/or other similar user interaction data 114 to the dynamic search platform 102 and, in response, the dynamic search platform 102 sends back signals or indications to filter out or skip types of entries based on the result filter rules 120, such that the displayed search result content on the interface 106 is the filtered search result content 110. Alternatively, in other examples, the user interaction data 114 includes only requests for additional search results, from which it is inferred that the user is scrolling past results or otherwise selecting to see new results. In such examples, those requests for additional results are analyzed as user interaction data 114 and result filter rules 120 are generated based on those requests, as described herein.

Further, in some examples, the user interaction data 114 and other associated context data is used to train an optimization model of the dynamic search platform 102 using machine learning techniques. The optimization model is trained to identify or determine the best times and/or locations at which to generate result filter rules 120 and/or prompt a user of the user device 104 regarding result filter rules 120. In an example, the optimization model is trained based on times and/or locations at which presented rules prompts are accepted by a user, and times and/or locations at which presented rules prompts are rejected by a user. The former case is used as a positive indication that the rules prompt was presented at an appropriate time and/or location, while the latter case is used as a negative indication that the rules prompt was presented at an undesirable time and/or location. These cases are used as training data to train the optimization model, which then determines when, where, and/or how rules prompts are presented to users. Such an optimization model can continue to be trained as the dynamic search platform 102 is used by various users. In other examples, more, fewer, or different applications of models trained using machine learning can be used without departing from the description.

Figure 2:
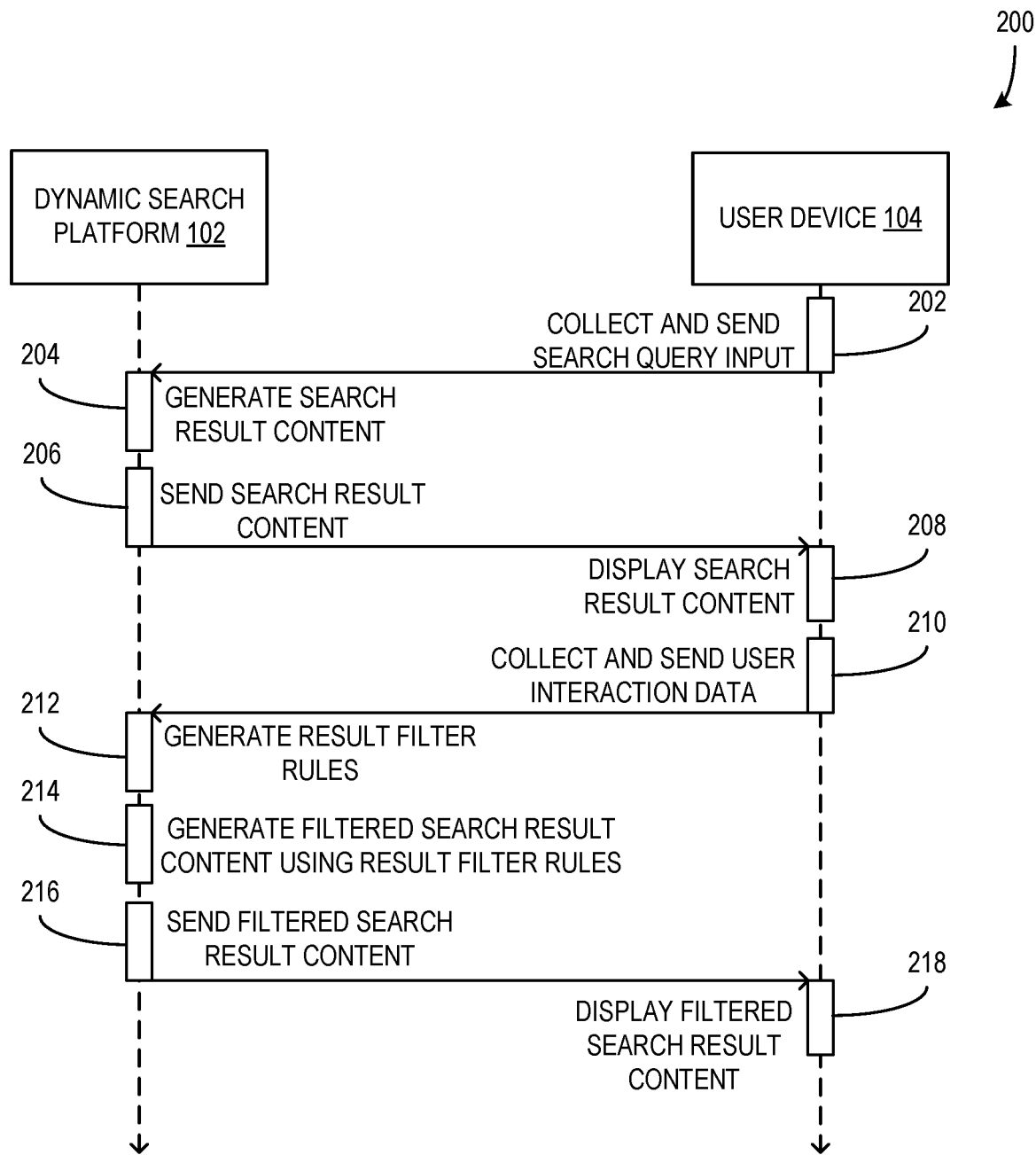
FIG. 2 is a sequence diagram illustrating an example method for filtering search result content based on user interaction data.

FIG. 2 is a sequence diagram illustrating an example method 200 for filtering search result content based on user interaction data. In some examples, the method 200 is executed or otherwise performed by or in association with a system such as system 100 of FIG. 1.

At 202, a user device 104 collects and sends search query input to the dynamic search platform 102. In some examples, the user device 104 prompts a user to provide search query input using a user interface (UI) of the user device 104. Further, in some such examples, the search query input is provided to the dynamic search platform 102 via a network connection when the dynamic search platform 102 is located on or otherwise associated with another device or devices. Alternatively, if the dynamic search platform 102 is located on or associated with the user device 104, the search query input is provided to the dynamic search platform 102 via internal communication channels of the user device 104.

At 204, search result content is generated by the dynamic search platform 102. In some examples, the dynamic search platform 102 includes a search engine that generates the search result content, including search result entries that are relevant to or otherwise associated with the search query input. Alternatively, in other examples, the dynamic search platform 102 is not configured to generate the search result content and, instead, the search query input is provided to another search engine entity which generates and provides the search result content to the dynamic search platform 102 and/or to the user device 104.

At 206, the search result content is sent from the dynamic search platform 102 to the user device 104. Alternatively, in other examples in which the search result content is generated by a different search engine entity, the search result content is sent from the search engine entity to the user device 104 and/or the dynamic search platform 102.

At 208, the search result content is displayed to a user. In some examples, the search result content is displayed in an infinite scroll format, such that the list of search result entries continues as the user scrolls through the entries. Alternatively, in some examples, the search result content is displayed in a paginated format, such that the list of search result entries is broken into multiple pages of entries, enabling a user to navigate among the pages of entries when viewing the search result content. In other examples, other methods of displaying the search result content are used without departing from the description.

At 210, the user device 104 collects user interaction data (e.g., user interaction data 114 using a user input interface 112) and sends the collected user interaction data to the dynamic search platform 102. In some examples, the user interaction data 114 includes scrolling data 116 and/or other types of user interaction data 114, such as data indicating entries that the user selects, data indicating time spent viewing entries, or the like. It should be understood that, in some examples, the user interaction data is continuously collected and sent to the dynamic search platform 102 while the user is interacting with the search result content, such that the collection and sending of the user interaction data occurs multiple times throughout the execution of the method 200.

At 212, the dynamic search platform 102 generates result filter rules 120 using the user interaction data 114 sent by the user device 104. In some examples, the dynamic search platform 102 generates result filter rules 120 in the same way as described above with respect to FIG. 1. For example, the dynamic search platform 102 generates one or more result filter rules 120 that are configured to filter the search result content based on types of search result entries. Alternatively, or additionally, the dynamic search platform 102 generates one or more result filter rules 120 that are configured to filter the search result content based on dates associated with search result entries, authors or other individuals associated with search result entries, sources of search result entries, or the like.

At 214, the dynamic search platform 102 generates filtered search result content 110 using the result filter rules 120. In some examples, the filtered search result content 110 includes all of the search result content with the result filter rules applied. Alternatively, in other examples, the filtered search result content 110 includes search result content that has not yet been displayed to the user with the result filter rules applied. Further, in some examples, generating the filtered search result content 110 includes applying the result filter rules 120 to the search result content 108 that was originally obtained from a search engine entity. Alternatively, in other examples, generating the filtered search result content 110 includes performing or otherwise causing another search to be performed by a search engine entity in which the result filter rules 120 are incorporated into the search query input. In such an example, the results from the new search are used as the filtered search result content 110.

In some other examples, the dynamic search platform 102 is configured to send subsets (e.g., portions) of the search result content and/or associated filtered search result content 110 in batches based on requests or other data received from the user device 104. In such examples, the filtered search result content 110 includes a subset (e.g., a non-empty portion) of the search result content with the result filter rules 120 applied, such that each batch of search result content has the result filter rules 120 applied after the result filter rules 120 are generated.

At 216, the filtered search result content 110 is sent to the user device 104 and, at 218, the filtered search result content 110 is displayed to a user. In some examples, the filtered search result content 110 is displayed as part of an infinite scroll interface and/or as part of a paginated search result display format, as described herein. Further, in some examples, the display of the filtered search result content 110 includes a notification to the user that the displayed search result content has been filtered and/or a description of the filter or filters that have been applied to the search result content.

Figure 3:
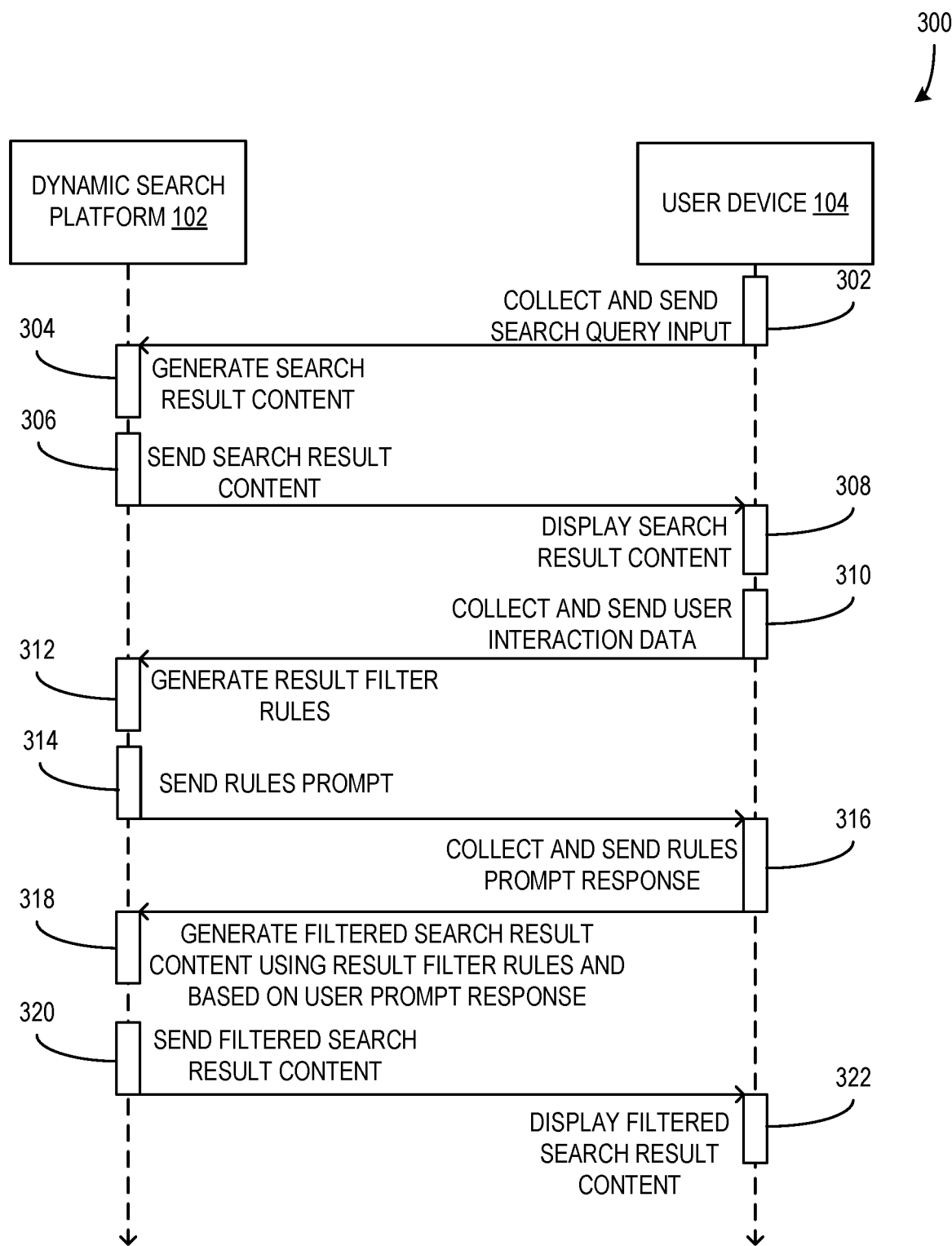
FIG. 3 is a sequence diagram illustrating an example method for prompting a user to filter search result content based on user interaction data.

FIG. 3 is a sequence diagram illustrating an example method 300 for prompting a user to filter search result content based on user interaction data. In some examples, the method 300 is executed or otherwise performed by or in association with a system such as system 100 of FIG. 1.

At 302, a user device 104 collects and sends search query input to the dynamic search platform 102. At 304, search result content is generated by the dynamic search platform 102 and, at 306, the search result content is sent from the dynamic search platform 102 to the user device 104. At 308, the search result content is displayed to a user and, at 310, the user device 104 collects user interaction data (e.g., user interaction data 114 using a user input interface 112) and sends the collected user interaction data to the dynamic search platform 102. At 312, the dynamic search platform 102 generates result filter rules 120 using the user interaction data sent by the user device 104. It should be understood that, in some examples, 302, 304, 306, 308, 310, and 312 are executed or otherwise performed in substantially the same way as described above with respect to at least 202, 204, 206, 208, 210, and 212 of FIG. 2, respectively.

At 314, the dynamic search platform 102 sends a rules prompt to the user device 104 and, at 316, the user device 104 collects and sends a rules prompt response to the dynamic search platform 102. In some examples, the rules prompt includes information that describes the generated result filter rules 120 and enables a user of the user device 104 to select and/or reject one or more of the result filter rules 120. For example, the rules prompt includes information describing a set of three generated result filter rules 120, including indicating how each result filter rule will filter the entries of the search result content if applied. For example, rule 1 will filter out entries of type X, rule 2 will filter out entries that are older than date Y, and rule 3 will filter out entries that are from source Z.

The rules prompt is displayed to a user of user device 104 in such a way that the user is enabled to accept or reject the application of one or more of the result filter rules 120 to the search result content. For example, the rules prompt enables the user to accept or reject the application of all three result filter rules to the search result content. Alternatively, in another example, the rules prompt enables the user to accept some of the rules while rejecting other rules. In an example, the user is provided a set of checkboxes or other similar interface components that they can use to indicate acceptance of each rule individually.

At 318, the dynamic search platform 102 generates filtered search result content using the result filter rules and based on the user prompt response. In some examples, the filtered search result content includes all the search result content with the result filter rules applied. Alternatively, in other examples, the filtered search result content includes search result content that has not yet been displayed to the user with the result filter rules applied. Further, in some examples, the filtered search result content is filtered using only the result filter rules that were accepted by a user of user device 104 as indicated in the rules prompt response sent by the user device 104. In an example, if a user accepted a first result filter rule and rejected a second result filter rule, the filtered search result content is generated by filtering the search result content using the first rule and not filtering the search result content using the second rule.

In some other examples, the dynamic search platform 102 is configured to send subsets of the search result content and/or associated filtered search result content in batches based on requests or other data received from the user device 104. In such examples, the filtered search result content includes only a portion of the search result content with the result filter rules applied, such that each batch of search result content has the result filter rules applied after the result filter rules are generated.

At 320, the filtered search result content is sent to the user device 104 and, at 322, the filtered search result content is displayed to a user. In some examples, the filtered search result content is displayed as part of an infinite scroll interface and/or as part of a paginated search result display format, as described herein. Further, in some examples, the display of the filtered search result content includes a notification to the user that the displayed search result content has been filtered and/or a description of the filter or filters that have been applied to the search result content.

Figure 4:
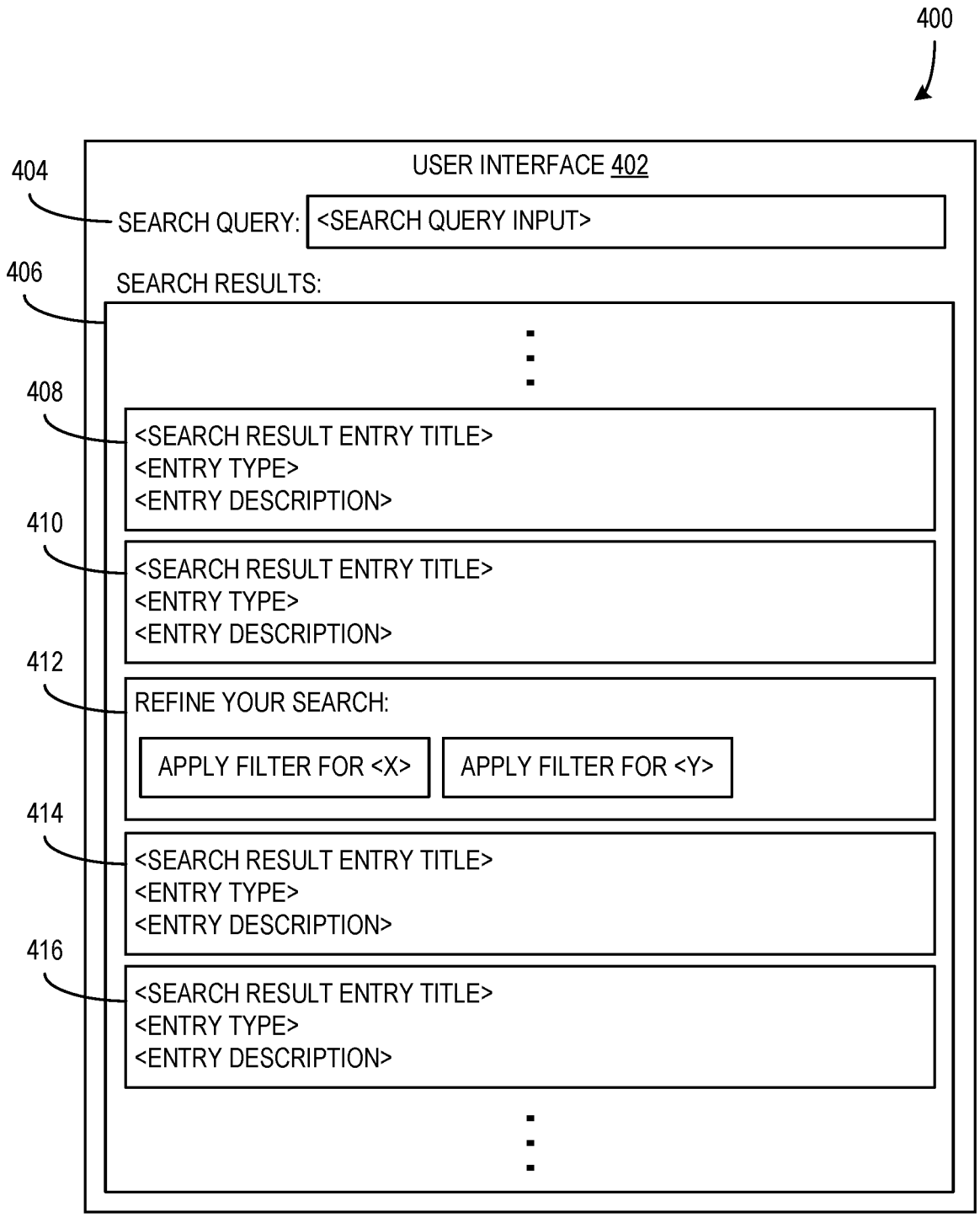
FIG. 4 is a diagram illustrating an example user interface (UI) configured for displaying search result content and a rules prompt.

FIG. 4 is a diagram 400 illustrating an example UI 402 configured for displaying search result content 408, 410, 414, and 416 and a rules prompt 412. In some examples, the UI 402 is displayed or otherwise provided to a user in a system such as system 100 of FIG. 1. Further, in some examples, the UI 402 is displayed or otherwise provided to a user as part of a method such as at least methods 200 and 300 of FIGS. 2 and 3, respectively.

The UI 402 includes a search query section 404 and a search results section 406. The search query section 404 displays the search query input in a text interface component. In some examples, a user is enabled to enter the search query input via a user input interface (e.g., user input interface 112) and, based on the user completing the search query input, the search results section 406 is populated with search result content associated with the provided search query input, as described herein.

The search results section 406 displays search result content in the form of a list of search result entries. In some examples, the search results section 406 displays the search result content in an infinite scroll, or dynamically updated format. Alternatively, or additionally, the search results section 406 displays the search result content in a paginated format.

The search results section 406 displays search result entries 408, 410, 414, and 416. Each search result entry includes a title, a type, and a description. In other examples, more, fewer, or different data values are displayed for each search result entry without departing from the description. In some examples, a user of the UI 402 is enabled to scroll through the list of entries, select one or more entries, hide one or more entries, save one or more entries, or the like. Further, in examples where the search results section 406 displays entries in a paginated format, the user is enabled to navigate between pages of entries using page links or other similar interface components.

As the user scrolls through or otherwise interacts with the search result entries, a rules prompt 412 is received (e.g., the rules prompt sent by the dynamic search platform 102 at 314 of FIG. 3) and displayed in the list of search result content as illustrated. The rules prompt informs the user that they can refine their search and offers two different result filter rules that can be applied. If the user activates the button to apply the filter for <X> and/or the button to apply the filter for <Y>(where <X> and <Y>are descriptions of two different filters), the selected filters are applied to the search result content and filtered search result content is generated as described herein. It should be understood that, in other examples, the rules prompt 412 is displayed or otherwise provided to a user of the UI 402 in other ways without departing from the description. In an example, the rules prompt 412 is displayed as a separate window interface from the search results section 406 that overlaps the search results section 406 such that the user is prompted to respond prior to continuing to view the search result content.

Figure 5:
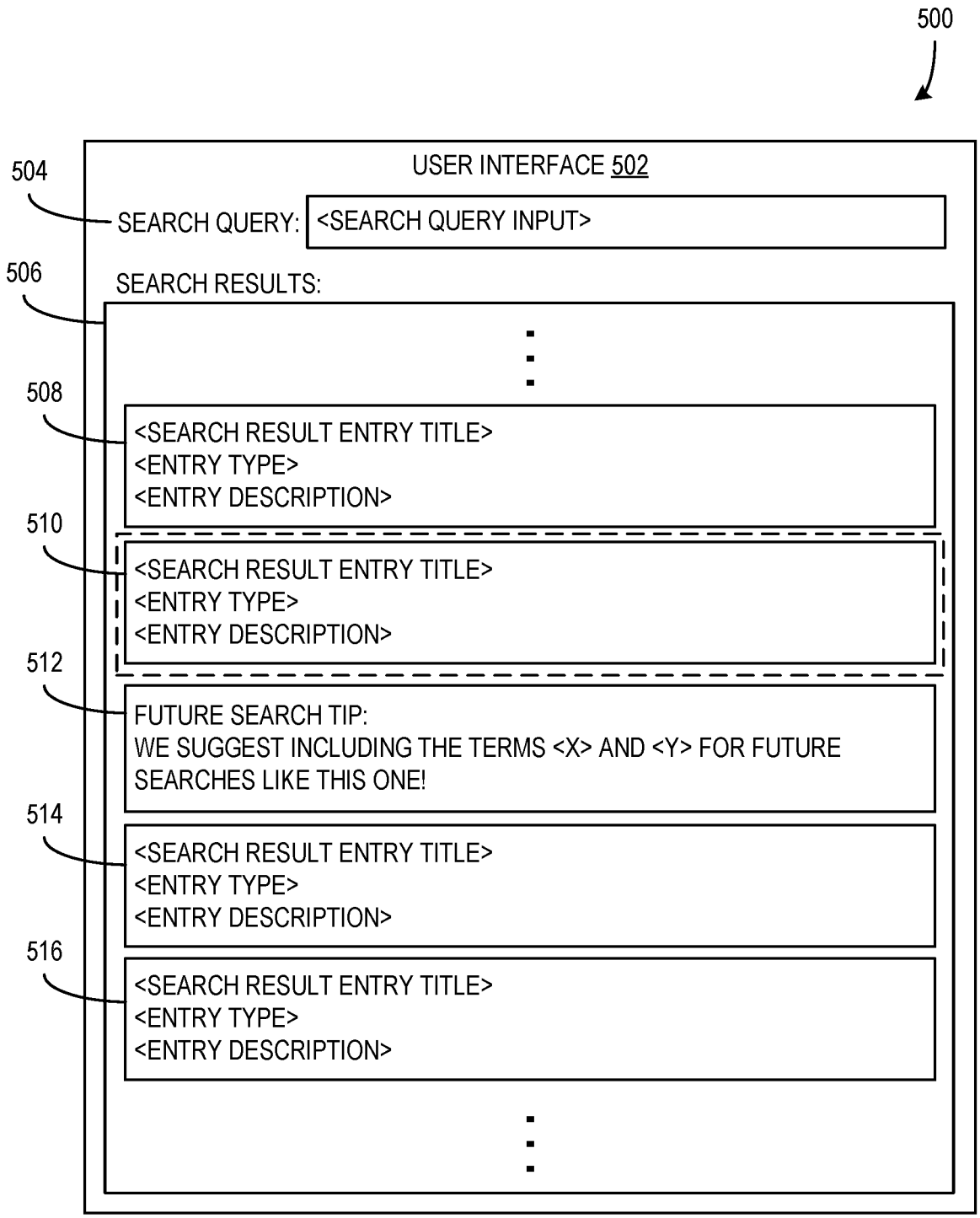
FIG. 5 is a diagram illustrating an example UI configured for displaying search result content and suggested search query input.

FIG. 5 is a diagram 500 illustrating an example UI 502 configured for displaying search result content 508, 510, 514, and 516 and suggested search query input 512. In some examples, the UI 502 is displayed or otherwise provided to a user in a system such as system 100 of FIG. 1. Further, in some examples, the UI 502 is displayed or otherwise provided to a user as part of a method such as at least methods 200 and 300 of FIGS. 2 and 3, respectively.

The UI 502 includes a search query section 504 and a search results section 506. The search query section 504 displays the search query input in a text interface component. In some examples, a user is enabled to enter the search query input via a user input interface (e.g., user input interface 112) and, based on the user completing the search query input, the search results section 506 is populated with search result content associated with the provided search query input, as described herein.

The search results section 506 displays search result content in the form of a list of search result entries. In some examples, the search results section 506 displays the search result content in an infinite scroll, or dynamically updated format. Alternatively, or additionally, the search results section 506 displays the search result content in a paginated format.

The search results section 506 displays search result entries 508, 510, 514, and 516. Each search result entry includes a title, a type, and a description. In other examples, more, fewer, or different data values are displayed for each search result entry without departing from the description. In some examples, a user of the UI 502 is enabled to scroll through the list of entries, select one or more entries, hide one or more entries, save one or more entries, or the like. Further, in examples where the search results section 506 displays entries in a paginated format, the user is enabled to navigate between pages of entries using page links or other similar interface components.

As the user scrolls through or otherwise interacts with the search result entries, suggested search query input 512 is received (e.g., the suggested search query input 512 is generated by the dynamic search platform 102 as described herein) and displayed in the list of search result content as illustrated. The search query input 512 informs the user of changes that they can make to future search query inputs to improve the effectiveness of those searches. As illustrated, a user of UI 502 has selected the search result entry 510 and, as a result of that interaction, the suggested search query input 512 has been generated and provided to the UI 502 for display. It should be understood that, in other examples, the search query input 512 is displayed or otherwise provided to a user of the UI 502 in other ways without departing from the description. For example, the search query input 512 is displayed as a separate window interface from the search results section 506 that overlaps the search results section 506 such that the user is prompted to respond prior to continuing to view the search result content.

It should be understood that any features described with respect to UI 402 of FIG. 4 are also present in UI 502 of FIG. 5 in some examples. Alternatively, or additionally, it should be understood that any features described with respect to UI 502 of FIG. 5 are also present in UI 402 of FIG. 4 in some examples.

Figure 6:
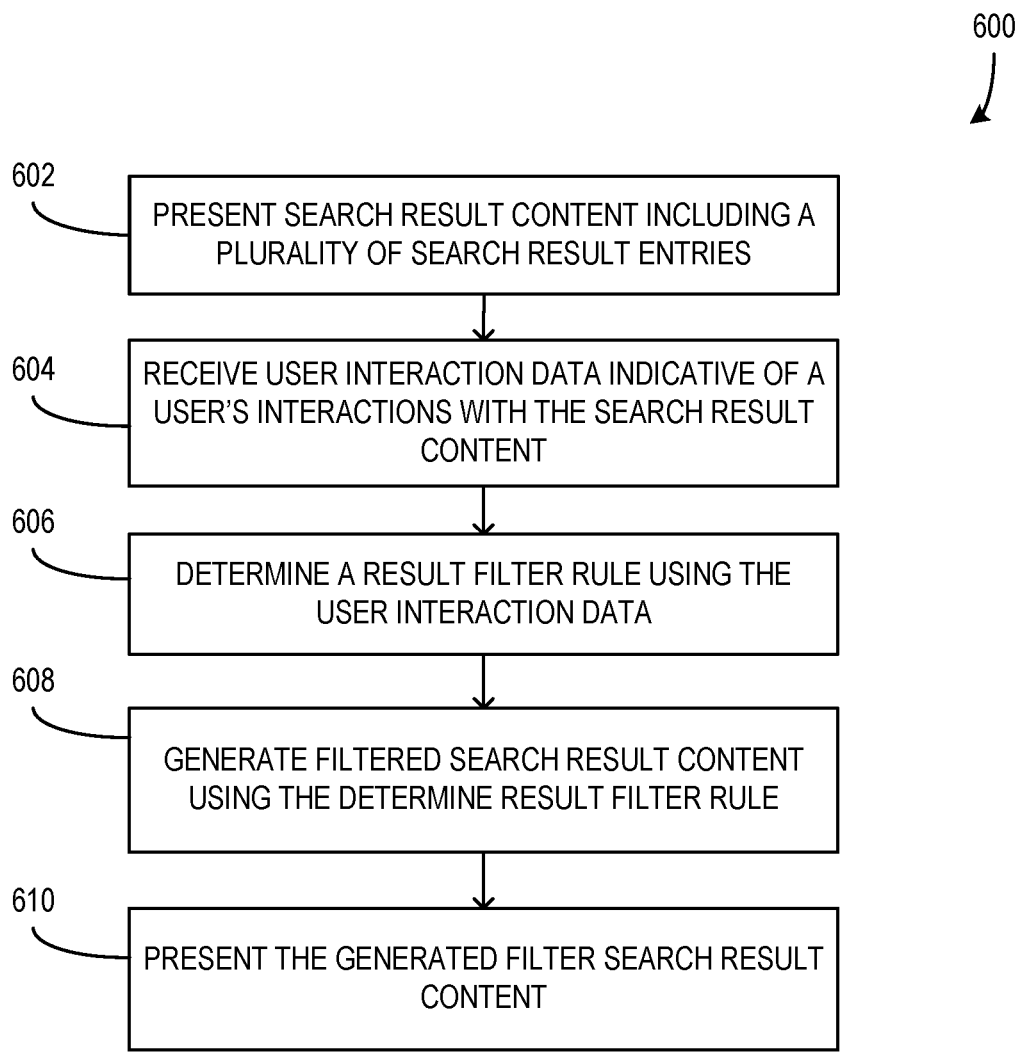
FIG. 6 is a flowchart illustrating an example method for filtering search result content based on user interaction data.

FIG. 6 is a flowchart illustrating an example method 600 for filtering search result content (e.g., search result content 108) based on user interaction data (e.g., user interaction data 114). In some examples, the method 600 is executed or otherwise performed by or in association with a system such as system 100 of FIG. 1.

At 602, search result content is presented, including a plurality of search result entries (e.g., search result entries 408, 410, 414, and/or 416). In some examples, the search result content is presented by displaying it on a display interface (e.g., display interface 106). Additionally, or alternatively, in some examples, the search result content is displayed in a user interface (e.g., UI 402 and/or UI 502). In some examples, presenting the search result content includes presenting the search result content in an infinite scroll or dynamically updating format and/or presenting the search result content in a paginated format as described herein.

At 604, user interaction data is received. The user interaction data is indicative of a user's interactions with the search result content. In some examples, the user interaction data includes scrolling data that is indicative of how the search result content is being scrolled through, the entries that are displayed as the scrolling occurs, the entries that are displayed when the scrolling stops, and the like. Alternatively, or additionally, the user interaction data includes entry selection data indicative of search result entries that are selected and other related data values, entry hiding data indicative of search result entries that are selected to be hidden from view and other related data values, viewed time data that is indicative of quantities of time spent viewing search result entries and other related data values, and/or page selection data indicative of page navigation that is performed to change the search result entries being viewed and other related data values. In other examples, more, fewer, and/or different types of user interaction data are used without departing from the description.

At 606, a result filter rule (e.g., result filter rule 120) is determined using the user interaction data. In some examples, the determination of the result filter rule includes determining a likely user intent using the user interaction data. For instance, if the user interaction data indicates that the user is scrolling past many search result entries of a particular entry type, the determined likely user intent is that the user is likely not interested in any search result entries of that type. In some examples, the determination of likely user intent includes determining the user's likely interest in one or more different classes of search result entries. Those one or more classes are then used to generate the result filter rule or rules, which are generated in such a way that they filter out one or more of the entry classes and/or prioritize one or more of the entry classes by filtering out entries that are not of the prioritized classes. Further, in some examples, the determination of the result filter rule as described herein is performed using a relevance model (e.g., relevance model 119) that has been trained using machine learning techniques.

In some examples, the result filter rule or rules that are determined filter the search result content based on at least one of the following search result entry classes: search result entry types (e.g., types of files, types of media, websites, or the like), search result entry authors (e.g., names of people who authored or were otherwise associated with the creation of the entry), search result entry sources (e.g., file locations where the entries are found, websites where the entries are found, or the like), and/or entry datetime data (e.g., entries that are older than a defined threshold, entries that are younger than a defined threshold, entries that fall within a defined range of datetimes, or the like).

At 608, filtered search result content (e.g., filtered search result content 110) is generated using the determined result filter rule. In some examples, generation of the filtered search result content includes application of one or more result filter rules to the search result content, such that entries targeted by the one or more result filter rules are removed from the search result content to generate the filtered search result content. Further, in some examples, some of the search result content has already been displayed and, as a result, the filtered search result content is generated from the portion of the search result content that has yet to be displayed. Alternatively, in other examples, the filtered search result content is generated from the entirety of the search result content without departing from the description.

At 610, the generated filtered search result content is presented. In some examples, the filtered search result content is displayed in the same interface as the search result content as described above at 602. Further, in some examples, the filtered search result content is displayed immediately after the most recently displayed unfiltered search result content in a seamless way, such that a user is enabled to continue scrolling and/or otherwise navigating the aggregated search result content without significant disturbance due to the filtering process. Alternatively, or additionally, in some examples, the presenting or displaying of the filtered search result content includes a notification to a user that the content has been filtered and/or information is included that describes how the content was filtered.

In some examples, the determination of the result filter rule is also based on other data, such as user context data, in addition to the user interaction data. User context data includes data associated with the user and/or a user profile for which the search was performed. In some examples, user context data includes data such as a user's age, user's position, recent meetings or other events on the user's calendar, the time of the search, or the like, which can be of use in determining the user's likely intent. Additionally, or alternatively, in some examples, the user context data includes data associated with past searches, such as the types of search query input the user has used in the past, the types of entries the user has found based on those search query inputs, or the like. Such user context data is used to more accurately determine when and how search result content should be filtered. Additionally, in some examples, such user context data is used to make more accurate suggestions as to suggested search query inputs as described herein.

Figure 7:
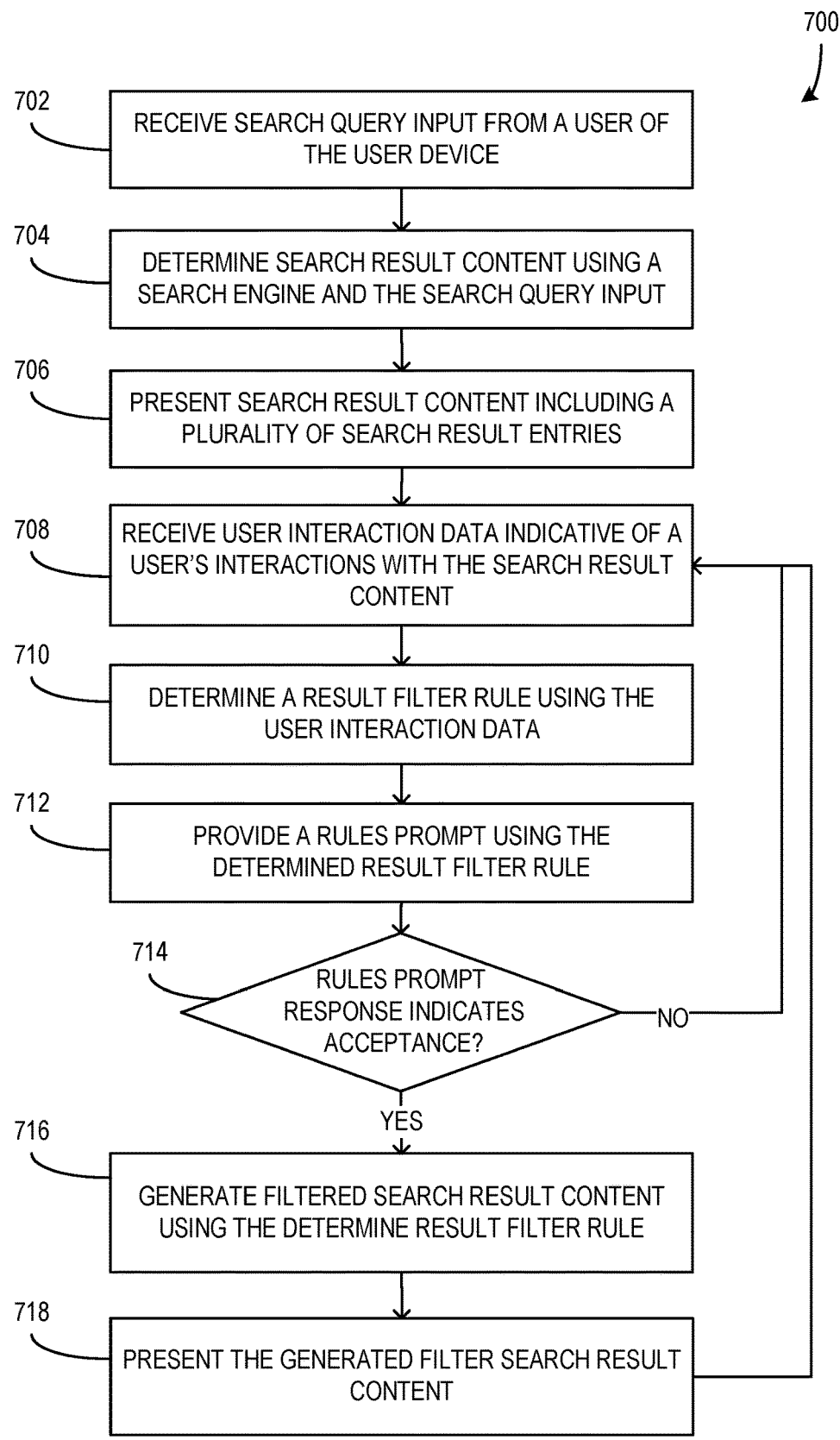
FIG. 7 is a flowchart illustrating an example method for prompting a user to filter search result content based on user interaction data.

FIG. 7 is a flowchart illustrating an example method 700 for prompting a user to filter search result content based on user interaction data. In some examples, the method 700 is executed or otherwise performed by or in association with a system such as system 100 of FIG. 1.

At 702, search query input is received from a user of the user device (e.g., user device 104). In some examples, the search query input is provided to the user device by the user via an input interface (e.g., user input interface 112). For instance, the user types in a series of words and/or phrases as the search query input using a keyboard. Alternatively, in other examples, the search query input is provided in other ways without departing from the description.

At 704, search result content is determined using a search engine and the search query input. In some examples, the search engine used to determine the search result content is a part of the dynamic search platform (e.g., dynamic search platform 102) being used to filter the search result content as described herein. Alternatively, in other examples, the search engine is separate from the dynamic search platform, such that the search result content is determined by the search engine and provided to the dynamic search platform for processing as described herein. In other examples, other arrangements or organizations of the search engine, dynamic search platform, and any user device are used without departing from the description.

At 706, search result content is presented, wherein the search result content includes a plurality of search result entries. In some examples, presenting the search result content is performed in the same way and/or with the same features as described above at 602 of FIG. 6.

At 708, user interaction data is received. The user interaction data is indicative of the user's interactions with the search result content. In some examples, receiving the user interaction data is performed in the same way and/or with the same features as described above at 604 of FIG. 6.

At 710, a result filter rule is determined using the user interaction data. In some examples, determining the result filter rule is performed in the same way and/or with the same features as described above at 606 of FIG. 6.

At 712, a rules prompt is provided using the determined result filter rule. In some examples, the rules prompt is displayed to a user of the user device via a display interface (e.g., display interface 106). In an example, the rules prompt is displayed in association with search result entries of the search result content that are being displayed, as described above with respect to FIGS. 4 and 5. Further, the rules prompt may display information about one or more result filter rules that are suggested to the user for application to the search result content. The rules prompt enables the user to accept or reject one or more of the suggested result filter rules as a response to the rules prompt. In such examples, the user is enabled to respond to each displayed rule separately, such as by activating a button or other interface component associated with each rule to indicate that that rule should be applied to the search result content).

At 714, a rules prompt response is received and, if that response indicates acceptance of the result filter rule, the process proceeds to 716. Alternatively, if the response does not indicate an acceptance of the result filter rule, the process returns to 708. In some examples, where the rules prompt includes multiple result filter rules and the user is enabled to accept and/or reject each of those multiple result filter rules separately, the rules prompt response is evaluated for a response to each of the multiple result filter rules. For each result filter rule that is accepted, the process proceeds to 716 as described herein. Rejected result filter rules are not applied and as illustrated, the process returns to 708 after the performance of 716 and 718 to apply any accepted result filter rules.

Further in some examples, the dynamic search platform 102 is trained to provide additional or future rules prompts that are similar to rules prompts that have been accepted and/or to refrain from providing additional or future rules prompts that are similar to rules prompts that have been rejected.

Additionally, or alternatively, to the rules prompt being provided, in some examples, a suggested query prompt is provided including information indicating one or more changes that could be made to the search query input to improve a likelihood that the search result content includes an entry for which the user is searching. In such examples, the suggested changes to the search query input are determined based on the generated result filter rules. For instance, if a result filter rule indicates that entries of a certain type should be filtered out of the search result content, an associated suggested change to the search query input includes a suggestion to include a search term that eliminates entries of that type from the potential search result content. In other examples, suggested changes are determined in other ways without departing from the description. For example, the user's search history is used to determine that the user never or rarely uses a particular search term that would be of use in the current search, so the suggested query prompt includes information describing the particular search term, how to use it, and why it would be useful in the current search. Alternatively, or additionally, the user's historical search data and other context data is used to determine a level of search sophistication or expertise of the user and to cater any suggested search changes to that level, so as not to overwhelm the user with complicated search terms or associated operations.

At 716, filtered search result content is generated using the determined result filter rule. In some examples, generating the filtered search result content is performed in the same way and/or with the same features as described above at 608 of FIG. 6.

At 718, the generated filtered search result content is presented. In some examples, presenting the generated filtered search result content is performed in the same way and/or with the same features as described above at 610 of FIG. 6.

Additionally, or alternatively, in some examples, the method 700 prompts users about search result entry groups that occur later in the search result content. For instance in some such examples, if the user interaction data indicates that the user is not likely to be interested in a currently presented subset of the search result entries, a group of search result entries that share similarities and that have not been presented yet are identified in the search result content. Additionally, in some such examples, the identified group of search result entries include a feature or detail that differs from the currently presented subset of the search result entries.

Upon identifying such a group of similar search result entries that have not yet been presented, an entry group prompt is provided to the user. The entry group prompt is displayed to the user and includes information about the group of similar search result entries, such as information describing the shared features between the entries of the group and/or other features thereof. Additionally, in some examples, the entry group prompt includes text that explains to the user that they seem to not be interested in currently displayed entries and/or asks the user if they would prefer to see the identified group of similar search result entries that have not yet been presented. Based on a received response to the entry group prompt indicating that the user wants to see the group of similar search result entries, the group of similar search result entries are then displayed to the user via the UI that had previously displayed the search result content as described herein. In this way, the described method is enabled to detect that currently presented search result entries are likely not what the user is looking for and to jump to a later group of search result entries that differ from what is currently displayed in an effort to more efficiently provide the user with the desired search results.

It should be understood that, in some examples, features described with respect to method 600 of FIG. 6 are used or otherwise included with respect to method 700 of FIG. 7. Additionally, or alternatively, in some examples, features described with respect to method 700 of FIG. 7 are used or otherwise included with respect to method 600 of FIG. 6.

Exemplary Operating Environment

Figure 8:
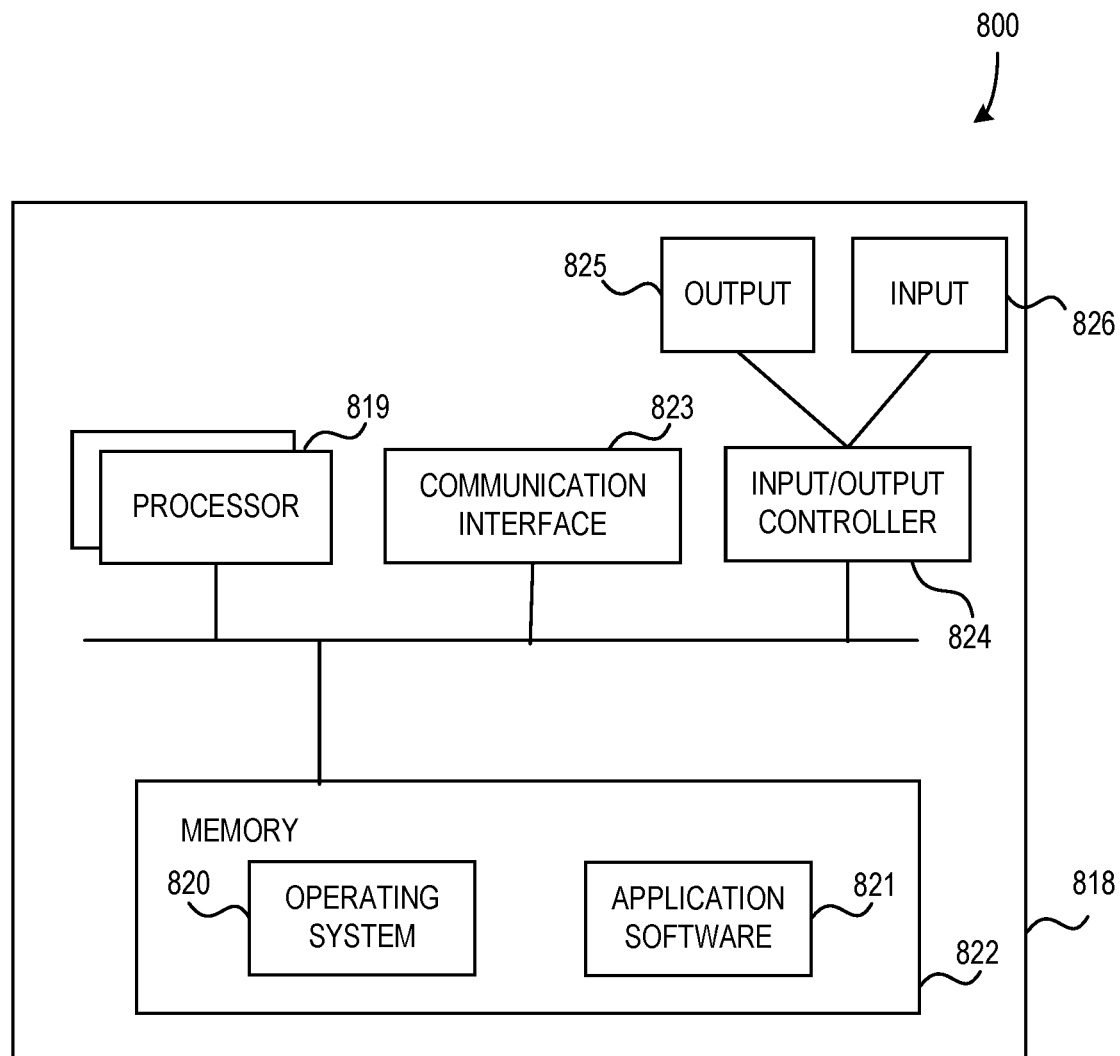
FIG. 8 illustrates an example computing apparatus as a functional block diagram.

The present disclosure is operable with a computing apparatus according to an embodiment as a functional block diagram 800 in FIG. 8. In an example, components of a computing apparatus 818 are implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. In some examples, platform software comprising an operating system 820 or any other suitable platform software is provided on the apparatus 818 to enable application software 821 to be executed on the device. In some examples, filtering search results based on user interaction data as described herein is accomplished by software, hardware, and/or firmware.

In some examples, computer executable instructions are provided using any computer-readable media that is accessible by the computing apparatus 818. Computer-readable media include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that, in some examples, the storage is distributed or located remotely and accessed via a network or other communication link (e.g., using a communication interface 823).

Further, in some examples, the computing apparatus 818 comprises an input/output controller 824 configured to output information to one or more output devices 825, for example a display or a speaker, which are separate from or integral to the electronic device. Additionally, or alternatively, the input/output controller 824 is configured to receive and process an input from one or more input devices 826, for example, a keyboard, a microphone, or a touchpad. In one example, the output device 825 also acts as the input device. An example of such a device is a touch sensitive display. The input/output controller 824 may also output data to devices other than the output device, e.g., a locally connected printing device. In some examples, a user provides input to the input device(s) 826 and/or receives output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a key board or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to, with the processor, cause the processor to: receive search query input from a user of the user device; determine search result content using a search engine and the received search query input; present search result content including search result entries on the UI: receive user interaction data indicative of a user's interactions with the presented search result content: determine a result filter rule using the user interaction data: provide a rules prompt using the determined result filter rule on the UI: receive a rules prompt response to the provided rules prompt; generate filtered search result content using the determined result filter rule and based on the received rules prompt response indicating acceptance of the determined result filter rule; and present the generated filtered search result content, wherein the filtered search result content includes a subset of the search result entries.

An example computerized method comprises: presenting search result content including search result entries: receiving user interaction data indicative of a user's interactions with the presented search result content: determining a result filter rule using the user interaction data: generating filtered search result content using the determined result filter rule; and presenting the generated filtered search result content, wherein the filtered search result content includes a subset of the search result entries.

One or more computer storage media having computer-executable instructions that, upon execution by a processor, cause the processor to at least: cause search result content including search result entries to be presented: receive user interaction data indicative of a user's interactions with the presented search result content: determine a result filter rule using the user interaction data: generate filtered search result content using the determined result filter rule; and cause the generated filtered search result content to be presented, wherein the filtered search result content includes a subset of the search result entries.

Alternatively, or in addition to the other examples described herein, examples include any combination of the following:

wherein determining a result filter rule includes: determining a likely user intent using the user interaction data, wherein the likely user intent indicates that a user associated with the user interaction data is likely not interested in a class of search result entries of the search result content; and generating the result filter rule to filter out the class of search result entries at which the determined likely user intent is directed.

wherein determining the likely user intent using the user interaction data includes determining the likely user intent using a relevance model that has been trained using machine learning techniques.

wherein determining the result filter rule using the user interaction data further includes determining the result filter rule using user context data, wherein the user context data includes context data from at least one of a user profile of a user from whom the user interaction data is received and a past search of the user from whom the user interaction data is received.

wherein presenting the generated filtered search result content includes maintaining search result entries of the search result content that have already been presented and presenting search result entries of the filtered search result content when a new batch of search result entries is to be presented.

wherein the result filter rule filters the search result content based on at least one of the following: search result entry type, search result entry author, and date.

wherein user interaction data includes at least one of the following: scrolling data, entry selection data, entry hiding data, viewed time data, and page selection data.

wherein the memory and the computer program code configured to, with the processor, further cause the processor to: determine that the user lacks interest in a currently presented subset of search result entries using the user interaction data; identify a group of similar search result entries in the search result content that have not been presented yet: provide an entry group prompt using the identified group of similar search result entries on the UI: receive an entry group prompt response to the provided entry group prompt; and present the group of similar search result entries on the UI based on the entry group prompt response indicating that the user wants to see the group of similar search result entries.

wherein the computer-executable instructions, upon execution by a processor, further cause the processor to at least: determine a suggested search query input using the user interaction data; and provide a prompt including the suggested search query input.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for presenting search result content including search result entries: exemplary means for receiving user interaction data indicative of a user's interactions with the presented search result content: exemplary means for determining a result filter rule using the user interaction data: exemplary means for generating filtered search result content using the determined result filter rule; and exemplary means for presenting the generated filtered search result content, wherein the filtered search result content includes a subset of the search result entries.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    a processor of a user device;
    a user interface (UI) of the user device; and
    a memory comprising computer program code, the memory and the computer program code configured to cause the processor to:
        present a portion of search result content on the UI, the search result content including search result entries;
        receive user interaction data indicative of an interaction of a user with the presented search result content, the user interaction data including scrolling data;
        generate a result filter rule using the scrolling data, wherein the result filter rule uses the scrolling data to remove at least one of the search result entries from the search result content;
        provide a rules prompt using the result filter rule on the UI;
        receive a rules prompt response to the provided rules prompt;
        generate filtered search result content using the generated result filter rule and based on the received rules prompt response indicating acceptance of the generated result filter rule; and
        present the generated filtered search result content, wherein the filtered search result content includes another portion of the search result entries.

2. The system of claim 1, wherein generating the result filter rule includes:
  determining a likely user intent using the user interaction data, wherein the likely user intent indicates that the user associated with the user interaction data is likely not interested in a class of search result entries of the search result content; and
  generating the result filter rule to filter out the class of search result entries at which the determined likely user intent is directed.

3. The system of claim 2, wherein determining the likely user intent using the user interaction data includes determining the likely user intent using a relevance model that has been trained using machine learning techniques.

4. The system of claim 1, wherein the memory and the computer program code configured to, with the processor, further cause the processor to generate the result filter rule using user context data, wherein the user context data includes context data from at least one of a user profile of the user from whom the user interaction data is received and a past search of the user from whom the user interaction data is received.

5. The system of claim 1, wherein the result filter rule filters the search result content based on at least one of the following: search result entry type, search result entry author, and date.

6. The system of claim 1, wherein the memory and the computer program code configured to, with the processor, further cause the processor to:
  determine that the user lacks interest in a currently presented portion of search result entries using the user interaction data;
  identify a group of similar search result entries in the search result content that have not been presented yet;
  provide an entry group prompt using the identified group of similar search result entries on the UI;
  receive an entry group prompt response to the provided entry group prompt; and
  present the group of similar search result entries on the UI based on the entry group prompt response indicating that the user wants to see the group of similar search result entries.

7. The system of claim 1, wherein the scrolling data includes data indicative of at least one of:
  when the user scrolls through at least one of the search result entries;
  when the user scrolls past at least one of the search result entries;
  when the user stops scrolling and the search result entries that are currently displayed on the UI;
  how the search result content is being scrolled through;
  the search result entries that are displayed as scrolling occurs; or
  the search result entries that are displayed when scrolling stops.

8. The system of claim 1, wherein generating the result filter rule using the scrolling data comprises generating the result filter rule based on the user having scrolled past at least one of the search result entries.

9. The system of claim 1, wherein generating the result filter rule using the scrolling data comprises generating the result filter rule based on the user having scrolled past at least two search result entries that share at least one of a feature or a property.

10. The system of claim 1, wherein generating the result filter rule using the scrolling data comprises inferring that the user is not interested in at least two search result entries that share at least one of a feature or property.

11. A computerized method comprising:
  presenting search result content;
  receiving user interaction data indicative of a user interaction with the presented search result content, the user interaction data including scrolling data;
  generating a result filter rule using the scrolling data, wherein the result filter rule uses the scrolling data to remove at least one search result entry from the search result content;
  filtering the presented search result content using the generated result filter rule; and
  presenting the filtered search result content.

12. The computerized method of claim 11, wherein generating the result filter rule includes:
  determining a likely user intent using the user interaction data, wherein the likely user intent indicates that a user associated with the user interaction data is likely not interested in a class of search result entries of the search result content; and
  generating the result filter rule to filter out the class of search result entries at which the determined likely user intent is directed.

13. The computerized method of claim 12, wherein determining the likely user intent using the user interaction data includes determining the likely user intent using a relevance model that has been trained using machine learning techniques.

14. The computerized method of claim 11, further comprising generating the result filter rule using user context data, wherein the user context data includes context data from at least one of a user profile of a user from whom the user interaction data is received and a past search of the user from whom the user interaction data is received.

15. The computerized method of claim 11, wherein presenting the filtered search result content includes maintaining search result entries of the search result content that have already been presented and presenting search result entries of the filtered search result content when a new batch of search result entries is to be presented.

16. The computerized method of claim 11, wherein the user interaction data includes at least one of the following: entry selection data, entry hiding data, viewed time data, and page selection data.

17. A computer storage medium has computer-executable instructions that, upon execution by a processor, cause the processor to at least:
  cause search result content including search result entries to be presented;
  receive user interaction data indicative of a user interaction with the presented search result content, the user interaction data including scrolling data;
  determine a result filter rule using the scrolling data, wherein the result filter rule uses the scrolling data to remove at least one of the search result entries from the search result content;
  obtain filtered search result content using the determined result filter rule; and
  cause the filtered search result content to be presented, wherein the filtered search result content includes a portion of the search result entries.

18. The computer storage medium of claim 17, wherein determining the result filter rule includes:
  determining a likely user intent using the user interaction data, wherein the likely user intent indicates that a user associated with the user interaction data is likely not interested in a class of search result entries of the search result content; and generating the result filter rule to filter out the class of search result entries at which the determined likely user intent is directed.

19. The computer storage medium of claim 17, wherein the computer-executable instructions, upon execution by a processor, further cause the processor to determine the result filter rule using user context data, wherein the user context data includes context data from at least one of a user profile of a user from whom the user interaction data is received and a past search of the user from whom the user interaction data is received.

20. The computer storage medium of claim 17, wherein the computer-executable instructions, upon execution by a processor, further cause the processor to at least:

determine a suggested search query input using the user interaction data; and provide a prompt including the suggested search query input.

\* \* \* \* \*